United States Patent Office 3,305,000
Patented Feb. 21, 1967

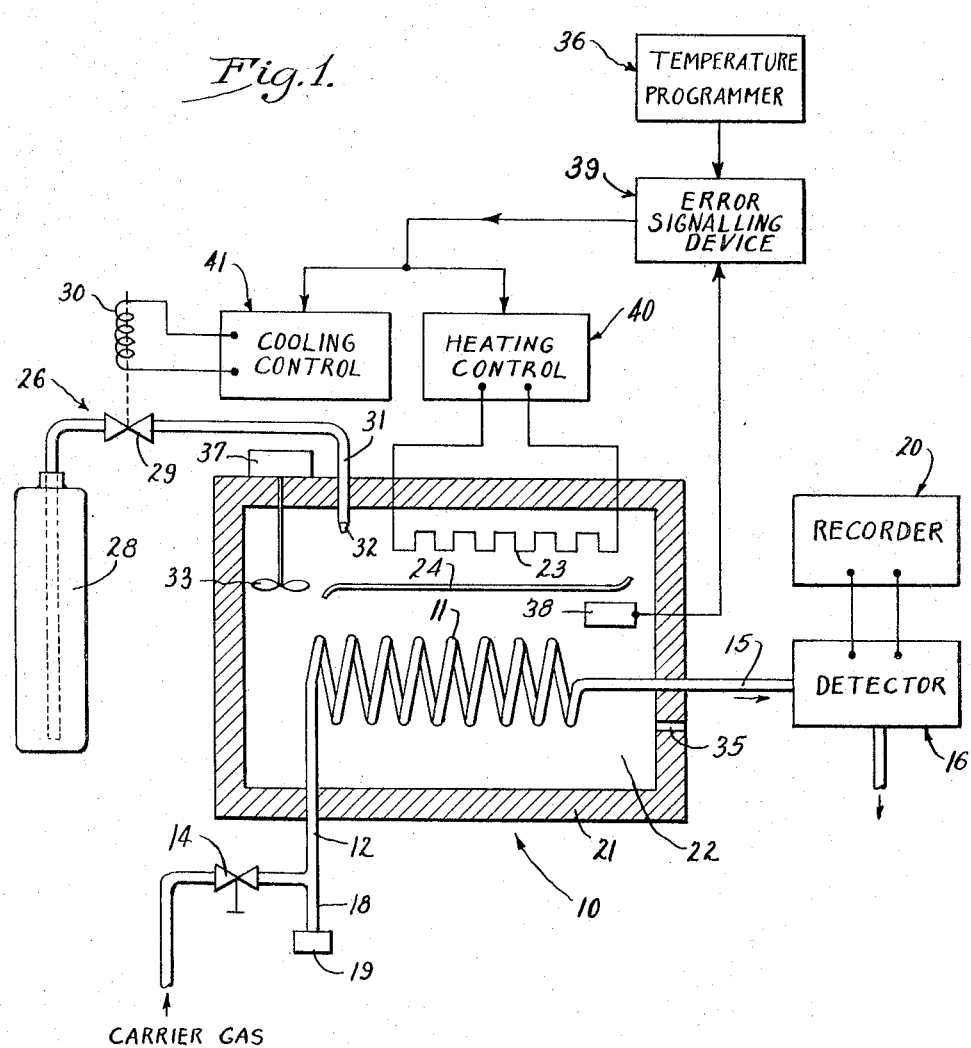

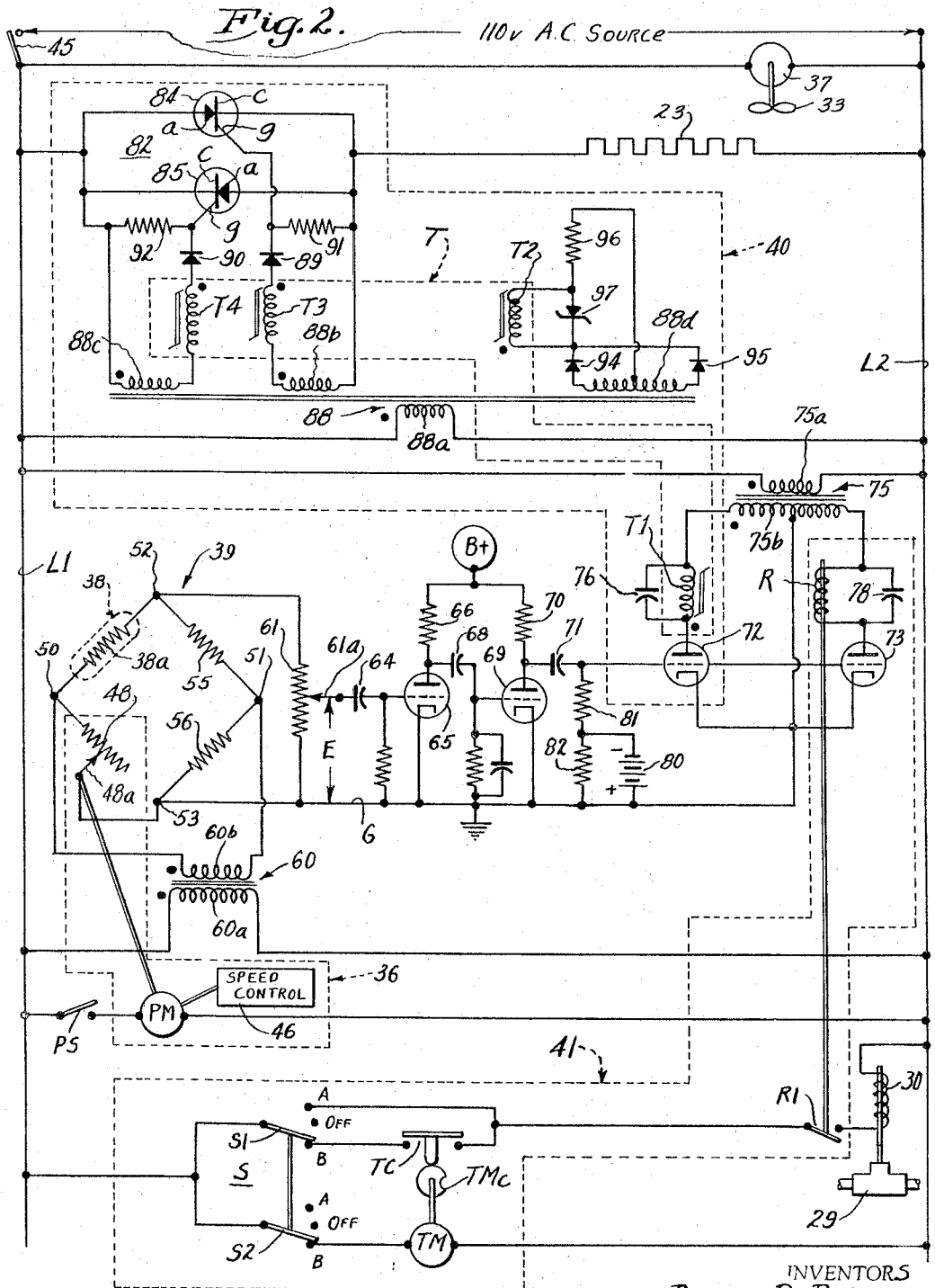

3,305,000
TEMPERATURE CONTROL SYSTEM FOR CHROMATOGRAPHS
Clark V. Bullen and Roger D. Peterson, Rockford, Ill., assignors to Barber-Colman Company, Rockford, Ill., a corporation of Illinois
Filed Feb. 8, 1965, Ser. No. 431,100
10 Claims. (Cl. 165—12)

The present invention relates in general to automatic control systems, and in particular to systems for controlling the temperature of a chromatograph column according to a desired program of variations.

In the practice of chromatographic separation of complex chemical substances into their constituent components for qualitative or quantitative analysis, and especially in gas chromatography, it has been recognized that the time intervals between the elution of the separate constituents, and the resolution or shortness of the constituent separations, are affected by the temperature of the chromatography column. It is often desirable to operate such a column at temperatures considerably above ambient room temperature in order to shorten the time intervals and sharpen response peaks resulting from relatively low mobility or low volatility constituents in the sample being analyzed. Such constituents are normally eluted toward the end of a sample run. Conversely, however, when the column is operated at room temperature to analyze a sample containing a number of constituents having relatively high mobilities or high volatilities (and which normally are eluted during the initial stages of a sample run), such constituents may be eluted in overlapping relation or with such short time separations as to be relatively indistinguishable from one another. Under these conditions it is desirable to operate the column at sub-ambient temperatures to lengthen the time intervals between the elution of the constituents. Ideally, therefore, it is desirable to operate a chromatography column at any of a wide range of temperatures both below and above ambient room temperature.

It is the general aim of the present invention to provide a temperature control system for a chromatograph column which not only makes possible operation of the column at any of a range of temperatures spanning the sub-ambient and superambient regions, but which does so with a high degree of flexibility, stability, and economy in operation.

More specifically, it is an object of the invention to provide such a system which will progressively and automatically vary the column temperature from a very low subambient value at the beginning of a sample run to a very high superambient value at the end of the run, thereby to enhance the separation intervals and the sharpness of the response peaks on the resulting chromatogram.

Another object of the invention is to provide a temperature control system for a chromatograph column which operates selectively to heat or cool the column when the temperature of the latter is respectively less than or greater than a desired value, and yet in which instability or overshooting of the column temperature relative to the desired temperature is avoided.

A related object of the invention is to provide such a system in which heating of the column is accomplished at a rate substantially proportional to the amount by which the column temperature is below the desired temperature, and which cooling of the column is accomplished by intermittent or spaced periods of cooling action when the column temperature is above the desired value, thereby to lessen the possibility of overshooting and cycling about the desired temperature value.

It is a further object of the invention to provide a system for controlling the temperature of a chromatograph column in the subambient region (e.g., at temperatures on the order of −180° C.) by the action of an extremely low temperature cooling fluid, in which the rate of cooling may be made quite high to quickly bring the column temperature to an initial low value, yet in which excessive rates of cooling action are avoided during programmed operation when the actual column temperature is not greatly different from the desired temperature.

Still another object is to provide a temperature control system for a chromatography column in which both heating and cooling means are selectively controlled to raise or lower the column temperature in order to maintain it at a desired value, such selective control requiring only a single, polarized error signal to govern both the heating and cooling operations.

Other objects and advantages will become apparent as the following description proceeds, taken in conjunction with the accompanying drawings, in which FIGURE 1 is a diagrammatic illustration, partly in block and line form, of a temperature control system embodying the features of the present invention and shown in association with a gas chromatograph, and FIG. 2 is a schematic circuit diagram illustrating in greater detail the organization of the temperature control system shown in FIG. 1.

While the invention has been shown and will be described in some detail with reference to a particular embodiment, there is no intention to thus limit the invention to such detail. On the contrary, it is intended here to cover all modifications, alterations, and equivalents falling within the spirit and scope of the appended claims.

A typical gas chromatograph 10 is diagrammatically illustrated in FIG. 1 as including a tubular column 11 which is packed with finely divided material (not visible). The column may, of course, be arranged in configurations other than the helical shape here shown, and it may be of the capillary rather than the packed type. An inlet conduit 12 receives carrier gas from a suitable source through a manually adjustable metering valve 14, the gas passing through the column, an outlet conduit 15 and thence through a suitable detector 16 which may be any one of the several varieties well known to those skilled in the art of gas chromatography.

A chemical sample to be separated and analyzed is suitably injected into the column inlet through a sample conduit 18 and an injecting septum 19. The constituents of the sample travel with different velocities, relative to that of carrier gas, through the column 11 and are eluted for passage through the detector 16 in time spaced relation. The detector includes means for electrically signaling the presence and concentration of constituents of differing characteristics passing therethrough, and such electric signals are supplied to a recorder 20 which plots or draws a chromatogram. The organization and operation of such gas chromatography apparatus is well known to those skilled in the art and need not be illustrated or described in greater detail.

As stated above, it is desirable in many cases to operate the column 11 at temperatures either above or below ambient room temperature so as to increase or decrease the time intervals between the elution of different constituents of the injected sample. In order to effect changes in the temperature of the column, the latter is surrounded by a housing or chamber 21 preferably made of heat insulating material and defining a bath 22 in which the column is disposed. To heat the bath and the column, and thus raise the temperature of the latter, a suitable heating means is disposed in heat exchange relationship with the column 11. While the heating means may take a variety of specific forms, that here shown by way of example is an electrical resistance element 23 disposed inside the housing 21 and preferably separated from the column 11 by a baffle 24 which prevents abrupt increases in the column temperature when the element is energized by current flow therethrough. The rate of heating of the bath 22, and the rate at which the temperature of the column 11 increases, depends upon the magnitude of the current passed through the heater element 23 and, more specifically, is substantially proportional to the rate at which electrical energy is dissipated in the element 23.

To cool the column 11 and lower its temperature, cooling means 26 are associated in heat exchange relationship with the column and the bath 22. In the preferred arrangement, the cooler 26 is collectively formed by a source of low temperature fluid, together with means for selectively introducing that fluid into the chamber where it absorbs heat from the column 11. As here shown, the cooling fluid source is constituted by a siphon tank 28 containing a liquefied gas which, upon admission into the chamber 22 and evaporation and expansion therein, lowers the temperature of the column. By way of example, the tank 28 may contain liquefied carbon dioxide or nitrogen, both being inert and non-toxic as well as operating to permit the temperature of the column 11 to be reduced to very low values on the order of $-65°$ C. (with carbon dioxide) or $-180°$ C. (with nitrogen). The coolant source or tank 28 communicates through an on-off control device here shown as a normally closed valve 29 which is actuated or opened in response to energization of an associated solenoid 30. When the valve is opened, the liquefied gas passes from the tank 28 through a conduit 31 and a nozzle 32 into the chamber where the evaporation of the gas absorbs heat from the bath and column to reduce the temperature of the latter. The baffle 24 is preferably interposed between the nozzle 32 and the column 11 in order to prevent abrupt and extreme localized cooling of only a part of the column. Mixing of the air in the bath, and thus more uniform temperature along all portions of the column 11, is promoted by a fan 33 driven by a small electric motor 37. Excess cooling gas bleeds out of the chamber 22 through one or more small vents 35.

In carrying out the present invention, means are provided to produce a signal indicative of a desired column temperature which changes according to a predetermined temperature vs. time program. Such means here takes the form of a temperature programmer 36 which will be described in more detail below. Additionally, means are provided to produce a signal indicative of the actual temperature of the column 11, this being shown in the present embodiment as a temperature sensing element 38 disposed within the chamber 22 and preferably in thermal contact with the column itself. As will be noted more fully below, the temperature sensing element may take the form of a thermocouple or temperature sensitive resistor which produces a voltage or resistance variation proportional to changes in the actual temperature of the column.

To keep the temperature of the column in agreement with the desired temperature represented by the programmer 36, the system includes means for selectively energizing the heater 23 or the cooler 26 when the actual column temperature is respectively below or above the desired temperature. For this purpose, the desired and actual temperature-representing signals are transmitted to an error signaling device 39 which produces a polarized error signal proportional in magnitude and corresponding in polarity to the difference between the desired and actual temperatures. This error signal, in turn, is applied to both a heating control 40 and a cooling control 41. In general terms, the heater control 40 includes means for energizing the heater 23 when the error signal is of one polarity, while the cooling control 41 includes means for energizing the cooler, by opening the valve 29, when the error signal is of the opposite polarity.

The system of FIG. 1 may be better understood from the more detailed circuit diagram of FIG. 2. In the exemplary embodiment there shown, the temperature programmer 36 comprises an alternating current, constant speed program motor PM which is energized and set in motion by closure of a programmer switch PS which connects it to a suitable source voltage. For convenience hereinafter, the term "source voltage" will be used to designate the voltage appearing between lines L1 and L2 which are connected to a suitable A.C. source whenever a main onoff switch 45 is closed. Closure of the switch energizes the fan motor 37 to cause circulation of the atmosphere inside the chamber 22. When the switches 45 and PS are closed to energize the motor PM by connecting it between lines L1 and L2, the motor runs at a substantially constant speed, the value of which is selectable or adjustable by setting an appropriate speed control device 46. The motor PM is coupled to drive the wiper 48a of a linear rheostat 48, and the resistance presented by the latter thus progressively increases or decreases with time and at a rate determined by the setting of the speed control 46. In the illustrated arrangement, as the wiper is driven in a downward direction, so as to progressively increase the effective resistance of the rheostat 48, the programmer calls for a progressively increasing desired temperature. The resistance of rheostat is thus directly indicative of the changing desired temperature. The ohmic resistance of the rheostat 48 therefore constitutes a changing signal which at any instant is indicative of a desired temperature according to a predetermined temperature program. Indeed, a scale (not shown) associated with the movable wiper 48a may be calibrated directly in degrees of temperature, and the range of temperatures which are represented by the full-scale movement of the wiper 48a may extend, for example, from $-200°$ C. to $+400°$ C. Therefore, at the beginning of a sample run through the chromatograph column, the wiper 48a may be manually set to a position at which the effective resistance of the rheostat 48 represents a desired initial temperature, and when the program motor PM is started by closure of the switch PS the resistance value of the rheostat 48 will linearly change with time to represent a desired linear change of the desired column temperature. If a nonlinear temperature vs. time program is desired, a nonlinear rheostat may be employed.

The temperature sensor 38 or means to produce a signal indicative of the actual temperature of the column 11, is here shown in FIG. 2 as a temperature-sensitive resistor 38a having a positive temperature coefficient of resistance. The ohmic resistance of the resistor 38a varies directly with its temperature, and thus the greater the temperature of the column 11, the higher will be the ohmic value of the resistor 38a.

The error signaling device 39 shown in FIG. 1 may, as indicated in FIG. 2, take the specific form of an A.C.-excited resistance bridge. As here shown, the rheostat 48 and the resistor 38a form the adjacent legs of a bridge circuit having input terminals 50, 51 and output terminals 52, 53. The other two legs of the bridge are formed by temperature-stable resistors 55 and 56 suitably chosen in their ohmic values so that the bridge is balanced when the desired temperature represented by the effective resistance of the rheostat 48 is equal to the actual temperature represented by the resistance of the resistor 38a. An A.C. excitation voltage is applied to the input terminals 50, 51 from the secondary winding 60b of a step-down transformer 60 which has its primary winding 60a energized by direct connection between the lines L1, L2. The output terminals 52, 53 of the bridge are connected to the opposite ends of a potentiometer 61 having a manually adjustable wiper 61a, so that an error signal E appears between the wiper and a conductor G at reference potential (here shown as ground).

As indicated above, the bridge 39 functions to produce an error signal which is proportional in magnitude and corresponding in polarity to the difference between the desired temperature represented by the resistance value of the programming rheostat 48 and the actual temperature represented by the resistance value of the resistor 38a. If it is assumed for the moment that the actual column temperature is lower than the desired column temperature, and that the resistance of resistor 38a is lower relative to the resistance of the rheostat 48 than would be the case if the bridge 39 were balanced, then the error signal E is a sinusoidal voltage which in amplitude is proportional to the magnitude of the temperature error, and which is in phase agreement with the alternating voltage appearing between lines L1 and L2. On the other hand, if the actual column temperature is higher than the desired column temperature, and the ratio of the resistances of the resistor 38a and the rheostat 48 is lower than it would be if the bridge 39 were balanced, then the error signal E is a sinusoidal A.C. voltage proportional in magnitude to the temperature error, but displaced 180° in phase relative to the A.C. source voltage which appears between lines L1 and L2. Thus, in the exemplary embodiment the polarized error voltage E is not a D.C. voltage which changes between a positive and negative polarity; rather, the error signal E is an alternating voltage which is of positive or negative phase (relative to the source voltage appearing between lines L1 and L2) depending upon whether the actual temperature of the column is lower or higher than the desired temperature. The manner in which this phase-polarized error signal is employed to effect selective heating or cooling of the column 11 may now be further described in detail.

The error signal E is preferably amplified by a two-stage amplifier before application to the heating and cooling controls. As shown in FIG. 2, the error signal E is applied through a coupling capacitor 64 to the grid of an amplifying vacuum tube triode 65 having its cathode connected to the reference conductor G and its anode connected through a load resistor 66 to a suitable source of positive D.C. voltage, here represented by the conventional symbol B+. Thus, the error signal E appears in amplified form and inverted phase at the anode of the amplifying triode 65. This amplified signal is coupled through a capacitor 68 to the grid of a second vacuum tube triode 69 similarly having its cathode connected to the ground conductor G and its anode connected through a load resistor 70 to the B+ voltage. Thus, the error signal is repeated at the anode of the amplifier 69 as an amplified A.C. voltage of the same phase which it has at the wiper 61a. In other words, the vacuum tubes 65 and 69 constitute a two-stage amplifier for the A.C. error signal and collectively produce no change in the phase of the amplified error signal.

In keeping with one aspect of the present invention, the amplified error signal is coupled to both the heating control 40 and the cooling control 41. More specifically, the signal appearing at the anode of the amplifier 69 is coupled through a capacitor 71 to the grids of two vacuum tube triodes 72 and 73 which respectively form component parts of the heating control 40 and the cooling control 41. In order to energize the heating means when the phase-polarized error signal is of one polarity, and to energize the cooling means when the phase-polarized error signal is of the opposite polarity, the anodes of the two triodes 72 and 73 are respectively connected through an input winding T1 and the coil of a control relay R to the opposite extremities of a center tapped secondary winding 75b of a transformer 75. The primary winding 75a of that transformer is excited by connection between the A.C. supply lines L1, L2. The center tap of the secondary winding 75b is returned to the cathodes of the triodes 72, 73, and this common point is connected to the reference conductor G. The anode of the triode 72 thus receives an A.C. voltage in phase with the A.C. source voltage, and the triode can conduct only during positive half cycles of the source voltage. Conversely, the anode of the triode 73 receives an A.C. voltage out of phase with the source voltage and can conduct only during negative half cycles of the latter. But neither triode can conduct current unless its control grid is above the cut-off potential (relative to its cathode) during those half cycles when its anode is at a positive potential.

By this arrangement, the input winding T1 will have pulsating current passed through it only when the error signal E is in phase with the A.C. source voltage appearing between lines L1 and L2. The magnitude of such current pulses, and thus the average value thereof, will be substantially proportional to the amplitude of the amplified error signal applied to the grid of triode 72. The input winding T1 is paralleled with a capacitor 76 which smoothes and filters the current flow through the input winding T1. Whenever the amplified error signal applied to the grid of the triode 72 is of positive phase polarity, and thus in phase with the voltage applied to the anode of that tube, so that the input winding T1 has pulsed current flow therethrough, the same input voltage applied to the grid of the triode 73 is in phase opposition to the A.C. voltage appearing at the anode of the triode 73. Accordingly, under these conditions the triode 73 passes substantially no current through the coil of relay R.

Thus, when the temperature error signal E indicates that the actual temperature of the column, signaled by the resistor 38a, is lower than the desired temperature, signaled by the value of the programmer rheostat 48, the input winding T1 in the heating control 40 receives current therethrough, while the relay R in the cooling control 41 remains de-energized.

Conversely, however, when the error signal E produced by the bridge 39 is out of phase with the A.C. source voltage appearing between lines L1 and L2 (i.e., is of "negative" phase polarity), the amplified A.C. error signal applied to the grids of both triodes 72 and 73 will be 180° out of phase with the A.C. voltage appearing at the anode of the triode 72, but will be in phase with the A.C. voltage applied to the anode of the triode 73. Under these circumstances, i.e., when the actual temperature of the column 11 is greater than the desired temperature, the input winding T1 will receive no energizing current, but the coil of the relay R will receive pulsed current flow therethrough, smoothed or filtered by a parallel capacitor 78, and thus the relay R will be energized and picked up.

Therefore, in keeping with the present invention, the heating control 40 and the cooling control 41 are respectively and selectively energized when the sensed temperature error is positive or negative. When the temperature error is reduced substantially to zero, however, so that the error signal E approaches zero amplitude, then neither the triode 72 nor the triode 73 conducts during the successive half cycles of the A.C. voltage applied to their anodes. Thus, neither the input winding T1 nor the coil of the relay R is energized, and neither heating nor cooling action occurs.

In keeping with a desirable feature of the present invention, means are provided to create a "dead band" in the response to the error signal, so that the system does not rapidly and falsely switch from a heating to a cooling mode. To accomplish this, means are provided to prevent any response of the triodes 72 and 73 in the heating control 40 and cooling control 41 unless the error signal exceeds a predetermined low amplitude. As here shown, this is achieved by connecting a suitable negative voltage source, here shown as a battery 80, so that it imposes a fixed negative bias on the grids of the tubes 72 and 73. In particular, the battery 80 is connected across one of two resistors 81, 82 which are in series between the grids and the cathodes of the triodes 72 and 73.

In keeping with the present invention, the heating control 40 operates to cause energy to be dissipated in the heating element 23 at a rate which is substantially proportional (although not necessarily linearly related) to the magnitude of the temperature error, but only when the actual column temperature is less than the desired column temperature. For this purpose, the heating element 23 is connected between the voltage supply lines L1, L2 through a full-wave controlled rectifier 82 here illustrated as two silicon controlled rectifiers (SCR's) 84, 85 connected in inverse parallel relationship. The characteristics of such SCR's are per se well known. Briefly stated, each SCR will conduct current only when its anode $a$ is positive with respect to its cathode $c$. However, such conduction will begin only if the gate electrode $g$ is made positive relative to a cathode by a voltage equal to or greater than a critical "firing potential." Once the SCR "fires" or begins conduction, however, the resistance across its anode-cathode junction is reduced to a negligible value, and the instantaneous value of current which flows depends substantially upon the ratio of the instantaneous value of the source voltage and the impedance of the load (i.e., the resistance element 23). Once fired, the SCR will continue to conduct current until its anode-cathode voltage is reduced substantially to zero or reversed in polarity.

It will be understood, therefore, that the two SCR's 84, 85 respectively conduct current in opposite directions through the heating element 23 during the positive and negative half cycles of the source voltage. The phase angle at which conduction begins during each successive half cycle, and this the effective value of the heating current passed through the element 23, depends upon the phase angle during each half cycle at which the gate electrodes $g$ are made positive relative to their associated cathodes.

To pulse the gate electrodes at phase angles which decrease as the magnitude of the error temperature increases, a magnetic core transducer T is employed. The transducer includes the input winding T1, a biasing winding T2, and output windings T3, T4, associated with two cores of ferromagnetic material having a substantially rectangular hysteresis characteristic. Because such a transducer is per se known in the control art, it will suffice simply to state that it functions to abruptly reduce the normally high impedance of the output windings T3, T4 at phase angles (on successive half cycles of a sinusoidal voltage applied thereto) which are inversely related to the magnitude of the average direct current flowing through the input winding T1. In other words, the transducer T converts the input current applied to the input winding T1 into a corresponding phase angle at which the windings T3 and T4 become conductive during successive half cycles of an A.C. voltage applied thereto, the phase angles decreasing from 180° towards 0° as the input current increases from zero toward some finite, maximum value. This operation results from the saturation of the magnetic cores associated with the transducer windings, the phase angle at which saturation occurs being determined by the initial flux level established as a result of the currents flowing in the input and biasing windings T1 and T2.

To utilize this transducer to control the full-wave rectifier 82, the output windings T3 and T4 are respectively connected in series with transformer secondary windings 88$b$ and 88$c$, diodes 89 and 90, and resistors 91 and 92, the latter being connected between the gates $g$ and cathodes $c$ of the respective SCR's 84 and 85. The secondary windings 88$b$ and 88$c$ are part of a transformer 88 having its primary winding 88$a$ excited from the alternating source voltage appearing between lines L1 and L2.

Considering for the moment the gate circuit associated with the SCR 84, the secondary winding 88$b$ is connected with a polarity such that on positive half cycles of the source voltage (i.e., when the anode $a$ of the SCR 84 is positive relative to the cathode $c$), the alternating voltage induced in the secondary winding tends to produce current flow in a forward direction through the diode 89. Normally, no appreciable current would flow due to the fact that the transducer output winding T3 presents a very high impedance. However, when that impedance drops abruptly, at a phase angle inversely proportional to the current through the winding T1, then current flow through the winding T3, the diode 89, and the resistor 91 creates a voltage drop across the latter making the gate $g$ positive with respect to cathode $c$ and firing the SCR 84. The latter then conducts for the remainder of the half-wave of the source voltage, and terminates conduction at the beginning of the succeeding half cycle which reversely biases the anode-cathode junction. During this succeeding and negative half cycle of the source voltage, the diode 89 prevents any current flow through the resistor 91, even though the impedance of the output winding T3 may fall abruptly at a given phase angle, and this prevents the application of a negative voltage pulse to the gate of the SCR 84.

The circuit which includes the secondary winding 88$c$, and output winding T4 operates in the same manner to apply a controlled phase firing potential to the gate $g$ of the SCR 85. In this case, however, the A.C. voltage induced in the secondary winding 88$c$ is 180° out of phase with that induced in the secondary winding 88$b$, so that the SCR 85 controls the conduction of current through the heater element 23 during the alternate or negative half cycles of the source voltage.

The biasing winding T2 of the transducer T serves to establish an initial flux level in the associated cores. And this in turn governs the factor of proportionality between the input current in the winding T1 and the phase angle at which impedance of the windings T3, T4 drops. In order to excite this biasing winding with a current having a substantially constant average D.C. value, a center tapped secondary winding 88$d$ for the transformer 88 is connected through full-wave rectifying diodes 94, 95 to a load resistor 96 and a Zener diode 97. The regulated D.C. voltage which thus appears across the Zener diode produces the necessary biasing current through the winding T2.

The operation of the heating control 40 may now be summarized. When the actual column temperature (signaled by the resistance of the resistor 38$a$) exceeds the desired programmed temperature (as signaled by the resistance of the rheostat 48), the amplified error signal applied to the grid of triode 72 is of a negative phase polarity, i.e., out of phase with the A.C. voltage applied to the anode of that triode. Thus, substantially no current flows through the transducer input winding T1, and the output winding T3 and T4 present such high impedances that no firing potentials are applied to the gates of the SCR's 84 and 85. The heating means is thus de-energized because substantially no current flows through the heater element 23. On the other hand, when the actual temperature of the column 11 falls below the desired temperature, and the amplified error signal is applied to the grid 72 with the positive phase polarity, the D.C. current through the input winding T1 increases in proportion to the increasing amplitude of the error signal, after the latter exceeds the negative bias of the battery 80. Accordingly, the windings T3 and T4 become conductive at phase angles which are reduced from 180° as the input winding current increases. Thus, the SCR's 84, 85 conduct for longer portions of the successive half cycles of the source voltage, and the heating current passing through the element 23 increases. As the temperature of the column then rises in response to this heating action, and the error signal is reduced in magnitude, the current flow through and the rate of heating by the element 23 decreases and becomes zero when the temperature error is very small. In this way, the heating means is energized only when the actual column temperature is below the programmed, desired temperature, and the rate of heating is directly related to the magnitude of the temperature error. Because the rate of energy input to the heating element 23, and thus the rate at which the temperature of the column 11 is increased, is directly related to the magnitude of the temperature error, any deviation of the column temperature below the desired value is quickly removed, but without substantial overshoot or cycling about the control point.

The cooling control 41 selectively energizes the cooling means 26 (FIG. 1) by controlling the energization of the solenoid 30 to open the valve 29. As shown in more detail by FIG. 2, the coil of the relay R connected in the anode circuit of the triode 73 controls normally open relay contacts R1 which are interposed in series with the solenoid 30 between the voltage source lines L1, L2. In the present instance, a selector switch S having ganged switch arms S1, S2 is utilized for a purpose to be made clear below. Assuming for the moment that the switch arms are set to engage the A contacts, then closure of the relay contacts R1 will directly energize the solenoid 30 to open the valve 29, admitting liquefied gas from the source 28 into the column chamber, and thereby reducing the column temperature.

As noted previously, when the actual column temperature (as signaled by resistance of a resistor 38a) is below the desired programmed temperature (as signaled by the value of the rheostat 48), the amplified error signal applied to the grid of the triode 73 is of positive phase polarity, i.e., 180° out of phase with the alternating voltage in the anode circuit of the triode. Thus, the coil of relay R receives substantially no current flow therethrough, the contacts R1 remain open, and the cooling means are de-energized. When, however, the actual column temperature is greater than the desired temperature, the error signal applied to the grid of the triode 73 is of negative phase polarity or, in other words, in phase with the anode voltage of that triode. If the amplified error signal is sufficient in amplitude to overcome the negative bias provided by the battery 80, exciting current flows through the coil of relay R so that contacts R1 close to energize the solenoid 30. The liquefied gas is thus introduced into the column chamber until the actual temperature of the column is lowered into approximate agreement with the desired temperature. The relay R is then de-energized so that its contacts open to close the valve 29 and terminate the flow of coolant. This action continues repeatedly and the valve 29 is turned on or off so as to keep the actual column temperature substantially in agreement with the desired programmed temperature.

The dead band bias of the battery 80 which results in de-energization of the cooling means before the temperature error is fully reduced to zero lessens the tendency of the column temperature to overshoot and swing greatly below the desired temperature. By this on-off control of the cooling means, the temperature of the column is successively reduced to and held at the desired temperature.

The introduction of a compressed or liquefied gas directly into the column bath 21 results in a very rapid reduction of the column temperature. This is advantageous when the column is to be cooled from ambient or superambient temperatures at the end of one program to a low sub-ambient starting point temperature for the beginning of the next sample run and temperature program. In one embodiment, for example, it is possible to reduce the column temperature from 190° C. to —65° C. in only eleven minutes by continuously admitting liquefied carbon dioxide into the chamber. However, in certain embodiments it has been found that once the temperature is reduced to the desired low value and control action begins, such rapid cooling action when the valve 29 is open may result in overshoot, i.e., swinging of the column temperature below the desired temperature when on-off action of the valve occurs in response to the error signal as the column temperature approaches the desired value.

In accordance with one feature of the present invention, this difficulty is obviated by causing the action of the cooling means to occur in short bursts or time spaced pulses whenever the error signal indicates that cooling action is required. Although this may be achieved in a variety of ways, it is accomplished in the embodiment of FIG. 2 by including in the cooling control 41 means to modulate or periodically interrupt the energization of the cooling means when cooling action is required. Referring specifically to FIG. 2 when the switch arms S1 and S2 are set to their B positions, as shown, the switch arm S2 completes an energizing path for a timer motor TM connected to drive a cam TMc or other suitable means which periodically closes the normally open timer contacts TC. It will be seen that the relay contacts R1 are connected in series through the selector switch contacts S1, B and the timing contacts TC with the solenoid 30 across the lines L1, L2. Thus, whenever the relay R is actuated and the contacts R1 are closed to call for cooling action, the solenoid 30 is periodically energized and de-energized as the timing contacts TC periodically close and open. In this way, the cooling action is intermittently applied to the column bath and column so that when the desired temperature is approached there is less tendency for the actual column temperature to overshoot and swing below the desired value. Moreover, economy in the use of the liquefied gas from the tank 28 is achieved, since less gas is used by avoiding overcooling which then has to be nullified by energization of the heater 23.

The present temperature control system makes possible a high degree of flexibilty in the operation of the chromatograph column 11. To effect temperature controlled operation, the main on-off switch 45 may be closed, and the wiper 48a manually adjusted to a position which represents any desired temperature, either above or below ambient. If the switch PS is left open, the rheostat wiper 48a will remain stationary, and the column temperature will be adjusted to and automatically maintained isothermally at that desired temperature. Under these conditions, the temperature of the column may be readjusted to another constant value simply by manually resetting the position of the rheostat wiper 48a.

When it is desired to cool the column quickly to a very low temperature, the switch S may be set to its A position so as to bypass the timer contacts TC, thereby continuously energizing the cooling means for very rapid lowering of the column temperature. When the desired point is reached, the switch S may be set to its B position so that the pulsing action of the timing contacts TC is obtained to prevent overshoot and cycling action of the part of the cooling means and thus conserve the supply of coolant.

Having once established the temperature of the column at a desired starting point value, the operator may then close the programmer switch PS to energize the programmer motor PM, and adjust the speed control device 46, so that the programming rheostat is adjusted in its resistance value at a desired rate. Under these circumstances, the heating and cooling means are selectively energized, as necessary, to increase or decrease the actual temperature of the column and to maintain that actual temperature in agreement with the changing desired temperature according to the selected program. While in most cases the program motor PM will operate so as to drive the wiper 48a in a direction to increase the resistance of the rheostat 48 and thus call for progressively increasing column temperatures, it is also possible to reverse the direction of rotation of the program motor PM. If that is done, the resistance of the rheostat 48 will progressively decrease with time, and the temperature of the column will follow a program with a negative temperature slope, i.e., so that the temperature of the column progressively and linearly decreases with time.

It will be seen, therefore, that the present temperature control system is one which not only enables the temperature of the chromatograph column to be controlled over a wide range including the sub-ambient and ambient regions, but which also enables the actual column temperature to be controlled according to a desired program of temperature variations involving either positive or negative slopes spanning both the sub-ambient or ambient regions.

We claim as our invention:

1. In a gas chromatograph having a column and a chamber defining a bath in heat exchange relationship with the column, the combination comprising a temperature sensor having means to sense the actual temperature of the bath and produce a first signal indicative of that temperature, a temperature programmer having means to produce a changing second signal indicative of a desired temperature according to a predetermined temperature versus time program, means responsive to said first and second signals for producing an error signal of one polarity or the other when the actual temperature is less than or greater than the desired temperature, a heater disposed in heat exchange relationship with the bath and adapted when actuated to raise the temperature of the column, a cooler disposed in heat exchange relationship with the bath and adapted to lower the temperature of the column, said cooler including a source of liquefied gas and selectively actuatable means to conduct a flow of said gas into the chamber, a controller having means receiving and responsive to said error signal for selectively actuating said heater or cooler when the error signal respectively has said one polarity or said other polarity, and an overriding modulating means for causing said flow-conducting means to be actuated intermittently to produce time-spaced pulses of gas flow into said chamber whenever said controller actuates said cooler.

2. A temperature controller for a gas chromatograph having a column and a chamber defining a bath in heat exchange relationship with the column, said chamber having an inlet thereto, said controller comprising in combination, a temperature sensor including means for sensing the actual tempertaure of the bath and producing a first signal indicative of that temperature, a temperature programmer including means for producing a changing second signal indicative of a desired temperature according to a program, means responsive to said first and second signals for producing an error signal of one polarity or the other when the actual temperature is less than or greater than the desired temperature, a selectively energizable heater disposed in heat exchange relationship with the bath and including means responsive to said error signal when the latter has said one polarity to raise the temperature of the bath, a cooler disposed in heat exchange relationship with the bath and including selectively energizable means to lower the temperature of the bath, said cooler comprising a source of liquefied gas of the type which absorbs heat when permitted to evaporate, normally closed means actuatable for conducting a flow of said gas through the inlet and into the chamber where it is allowed to evaporate and absorb heat from the bath, said conducting means including means responsive to said error signal when the latter has said other polarity to regulate said flow of said gas to cause it to enter said chamber inlet in intermittent pulses to reduce the possibility of overcooling the bath.

3. A temperature controller for a gas chromatograph having a column and a chamber defining a bath in heat exchange relationship with the column, said chamber having an inlet thereto, said controller comprising a temperature sensor including means for producing a first signal indicative of the actual temperature of the chamber, a temperature programmer including means for producing a second signal indicative of a desired temperature which varies according to a predetermined program, a heater disposed in heat exchange relationship with the column and adapted to raise the temperature of the column, said heater comprising an electrical resistance element disposed to transmit heat to said column when energized, a cooler adapted when energized, to lower the temperature of said bath; said cooler comprising a source of coolant fluid, selectively energizable means to conduct a flow of said coolant through the inlet and into the chamber where it absorbs heat from the column, and means to regulate said flow of coolant to cause it to enter the chamber in intermittent pulses to reduce the possibility of overcooling the column; and means for receiving and comparing said signals and selectively energizing said heater or cooler to adjust the actual temperature of said bath toward said desired temperature whereby the tempertaure of the column is automatically raised by energization of the heater or is automatically lowered by intermittent pulsed flow of said coolant fluid whenever the actual temperature is less than or greater than the desired temperature.

4. In a gas chromatograph having a column disposed in a bath, the combination comprising a temperature programmer having means for producing a first signal indicative of a desired bath temperature and which varies according to a predetermined program, sensing means for producing a second signal indicative of the actual temperature of the bath, comparing means responsive to said first and second signals for producing an error signal proportional in magnitude and corresponding in polarity to the difference between such signals, selectively energizable heating means to heat the bath and raise its temperature, a source of liquefied gas under pressure, selectively energizable means to transmit gas from said source into said bath to cool the latter and lower its temperature, first means responsive to said error signal having one polarity and greater than a predetermined deadband magnitude for energizing said heating means, and second means responsive to said error signal having the other polarity and greater than a predetermined deadband magnitude for energizing said transmitting means.

5. The combination set forth in claim 4 further characterized in that said first means includes means for energizing said heating means so as to produce heating at a rate substantially proportional to the magnitude of said error signal when the latter has said one polarity and exceeds said predetermined deadband magnitude.

6. The combination set forth in claim 4 and further characterized in that said second means includes means for intermittently actuating said transmitting means when the error signal has said other polarity.

7. In a system for controlling the temperature of a chromatograph column, the combination comprising a heater in heat exchange relationship with the column and including means for heating the column at a rate generally proportional to the rate of energy supplied to the heater, a cooler associated in heat exchange relationship with the column and adapted to be turned on or off, a programmer including means for producing a changing first signal representing the desired column temperature according to a predetermined program, sensing means for producing a second signal indicative of the actual column temperature, means responsive to said two signals for producing an error signal corresponding in magnitude to, and agreeable in polarity with, the difference between said two signals, means responsive to said error signal having one polarity and greater than a predetermined magnitude for supplying energy to said heater at a rate substantially proportional to the magnitude of the error signal, and means responsive to said error signal having the other polarity and greater than a predetermined magnitude for turning said cooler on.

8. In a gas chromatograph having a column, the combination comprising means for signaling the desired temperature of the column with a range spanning sub-ambient and super-ambient temperature values, means for signaling the actual temperature of the column, an electrical heating element disposed in heat exchange relation with the column, a source of compressed and liquefied gas and on-off control means for transmitting said liquefied gas into heat exchange relation with the column, means responsive to said two signaling means for supplying electrical energy to said heating element when said actual temperature is less than said desired temperature and at a rate generally proportional to the difference between such temperatures, and means responsive to said two signaling means for turning on said control means in intermittent, time-spaced pulses only when said actual temperature is greater than said desired temperature.

9. A temperature controller having an apparatus with a chamber surrounding and enclosing the apparatus to define a space in heat exchange relationship therewith, said controller comprising means to detect the deviation between a desired temperature and the actual temperature of the apparatus, a supply of liquefied gas, means responsive to said detecting means only when the actual temperature is greater than the desired temperature for conducting a flow of said liquefied gas directly into the chamber where it vaporizes and cools said apparatus by absorbing heat therefrom, and said conducting including means to provide intermittent time-spaced pulse flow of said gas only when the actual temperature is greater than the desired temperature thereby to achieve a closely regulated cooling of the apparatus.

10. In a system for controlling the temperature of a component disposed within and surrounded by a chamber which has an inlet thereto and an outlet therefrom, the combination comprising means to detect the temperature of the component, means to cool said component including a source of liquefied gas of the type that absorbs heat when permitted to evaporate, conduit means to discharge said liquefied gas through said inlet directly into said chamber where the gas may evaporate to cool said component by absorbing heat therefrom, means to control the flow of gas to said chamber comprising a solenoid controlled valve adapted to control gas flow through said conduit means, an electrical energy source, a first switch actuated in response to the temperature of the apparatus, a second switch having means to intermittently actuate the same, and means for energizing said solenoid valve from said electrical source only when both said switches are closed, thereby to cause a time spaced intermittent pulsed flow of gas to said chamber for a closely regulated cooling of said apparatus.

References Cited by the Examiner

UNITED STATES PATENTS

| | | | |
|---|---|---|---|
| 2,424,305 | 7/1947 | Davis | 165—12 |
| 3,043,127 | 7/1962 | Deford | 73—23.1 |
| 3,053,077 | 9/1962 | Tracht | 55—386 |
| 3,062,039 | 11/1962 | Ayers | 73—23.1 |
| 3,092,977 | 6/1963 | Skinner | 62—514 X |
| 3,122,199 | 2/1964 | Byloff | 165—40 X |
| 3,143,167 | 8/1964 | Vieth | 165—27 |
| 3,165,147 | 1/1965 | Roof et al. | 165—2 X |
| 3,195,620 | 7/1965 | Steinhardt | 165—2 |
| 3,212,562 | 10/1965 | Newton | 165—12 |
| 3,225,597 | 6/1966 | Carter | 62—239 X |

FOREIGN PATENTS 846,950   9/1960   Great Britain.

OTHER REFERENCES

Baumann, F., et al.: Subambient Programmed Temperature Gas Chromatography, Washington, D.C. Butterworths, 1962, Gas Chromatography, p. 152.

MEYER PERLIN, *Primary Examiner.*

ROBERT A. O'LEARY, *Examiner.*

M. A. ANTONAKAS, *Assistant Examiner.*